United States Patent
Brown

[15] 3,688,473
[45] Sept. 5, 1972

[54] UNDERWATER OIL PRODUCTION SEPARATOR

[72] Inventor: Stephen S. Brown, Baytown, Tex.

[73] Assignee: Esso Production Research Company

[22] Filed: March 12, 1969

[21] Appl. No.: 806,639

[52] U.S. Cl. ........................................55/38, 55/166
[51] Int. Cl. .................................................B01d 19/00
[58] Field of Search..............55/38, 43, 45, 164–167, 55/172, 174, 176, 183, 185; 196/111, 125; 203/40; 210/120, 253, 538

[56] References Cited

UNITED STATES PATENTS

| | | | |
|---|---|---|---|
| 1,115,827 | 11/1914 | Johnson | 210/253 |
| 1,242,292 | 10/1917 | White et al. | 196/111 |
| 1,708,021 | 4/1929 | Lenz et al. | 210/538 X |
| 2,242,110 | 5/1941 | Carney | 55/43 |
| 2,767,802 | 10/1956 | Orrell | 55/174 X |

*Primary Examiner*—Reuben Friedman
*Assistant Examiner*—R. W. Burks
*Attorney*—James A. Reilly, John B. Davidson, Lewis H. Eatherton, James E. Gilchrist and James E. Reed

[57] ABSTRACT

This horizontal separator is partitioned into two or more separation zones. A mixture of liquid and gas is introduced into each zone, where the phases are separated. Gas is discharged through a port in each separation and may be collected in a manifold for compression. Liquid from all the separation zones commingles in the bottom of the separator and is discharged through one or more ports. If the liquid is to be further separated into oil and water, one or more additional liquid outlet ports are added to the structure.

11 Claims, 3 Drawing Figures

PATENTED SEP 5 1972  3,688,473
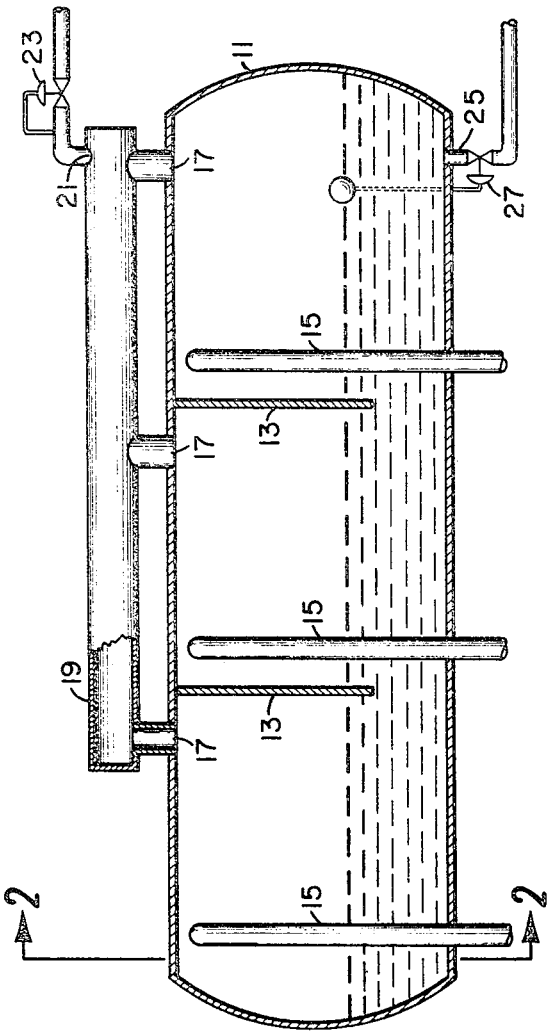
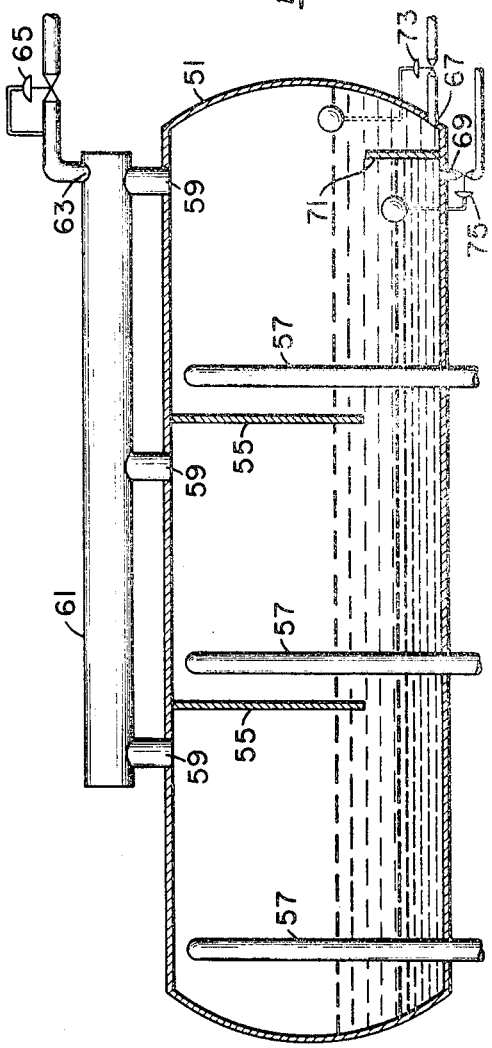
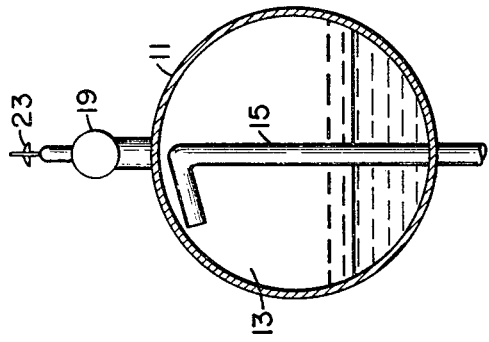
INVENTOR.
STEPHEN S. BROWN
BY James E. Gilchrist
ATTORNEY

UNDERWATER OIL PRODUCTION SEPARATOR

BACKGROUND OF THE INVENTION

1. Field of the Invention

This invention relates to a method and apparatus for separating well fluids into liquid and gaseous streams.

2. Description of the Prior Art

One of the primary requirements of an oilfield production system is the separation of produced fluids into oil, gas and water. This separation is normally accomplished by introducing the produced fluids into a separator vessel and reducing the pressure to liberate dissolved gas. The liquids, a substantial portion of which are entrained in the gas phase, then separate from the gas by gravity segregation.

The controlling design consideration for an oil and gas separator is gas capacity which can be increased by increasing the internal volume of the separator vessel available for gas. By increasing the internal volume of the vessel, the required gas residence time can be maintained as the rate of gas throughput is increased. Residence time is the average period a particle of gas spends within the separator and must be long enough to assure liquid particle dropout for effective separation.

Separator gas capacity is adversely affected by turbulence. Turbulence tends to retard the rate of liquid particle dropout within the separator, decreasing separator efficiency. The degree of turbulence increases rapidly as the rate of gas throughput is increased in a vessel of given diameter.

The gas capacity of a separation vessel can therefore be most effectively increased by enlarging the vessel diameter since this increases the internal volume of the vessel available for gas without increasing turbulence. Unfortunately, increasing vessel diameter is undesirable where the vessel is to be placed in an underwater location. In underwater service, vessel diameter is a critical design consideration because wall thickness must be rapidly increased as the diameter is increased to maintain collapse resistance. It would therefore be preferable to increase the gas residence time, and thus the gas capacity, of an underwater separator by increasing vessel length. But extending the vessel is generally an unsatisfactory way to increase the separator gas capacity because a point of diminishing returns is rapidly reached as a result of increased turbulence within the vessel.

Thus, known separator vessels present serious design problems when they are to be placed in service underwater.

SUMMARY OF THE INVENTION

The method and apparatus of this invention reduce the problems experienced with previous vessels for separating oil and gas in underwater production installations. The invention permits the length of the separator vessel to be increased as an effective means of increasing gas capacity, thereby significantly reducing the vessel diameter necessary for providing phase separation.

This method of separating a liquid from a gas includes introducing a separate inlet stream of well fluid into each of a plurality of separation zones, maintaining the pressure within each zone sufficiently low to permit the formation of a gas and liquid phase within each zone, withdrawing a separate stream of gas from each zone at a rate sufficient to substantially prevent gas flow between zones while permitting oil to flow between zones, and withdrawing liquid from the zones.

Apparatus for use with the method of the invention includes an elongated horizontal vessel; a plurality of substantially vertical partitions extending downwardly from the top of the vessel and terminating above the bottom of the vessel, said partitions dividing the vessel into a plurality of separation zones communicating with one another near their lower ends; a separate gas outlet in each separation zone, said outlet being positioned at a point remote from the well fluid inlet in the separation zone; and an oil outlet in the lower part of the vessel.

By dividing the vessel into several separation zones, separating only a fraction of the total input of well fluid in each zone, and withdrawing the gas from the zone it enters, the gas contained in each inlet stream is confined to the separation zone into which it is introduced until it is withdrawn from the vessel. This reduces the rate of gas flow within a separation zone to a fraction of that which would exist within a conventional vessel having the same total throughput and the same dimensions. Thus, the degree of turbulence within a separator vessel can be substantially reduced without any sacrifice in retention time, resulting in increased separation efficiency.

The gas manifold serves a dual function. It acts as a gathering manifold for gas separated in the different separation zones and as an additional liquid extraction zone in which droplets of lid carried from the separation zones coalesce and gravitate back into the separation zones. The separator of the invention has the same amount of piping and controls as a conventional separator of the same capacity, but will normally have a smaller diameter. Because of these other advantages, the separator of the invention is superior to separator vessels known heretofore.

BRIEF DESCRIPTION OF THE DRAWINGS

FIG. 1 is a cross-sectional front view of an oil and gas separator built according to the invention.

FIG. 2 shows a cross-section of the separator of FIG. 1 along line 2—2'.

FIG. 3 is a cross-sectional front view of a separator constructed in accordance with the invention for separation of oil, gas and water.

DESCRIPTION OF THE PREFERRED EMBODIMENTS

As shown in FIG. 1, the separator of the invention includes an elongated horizontal vessel 11 which is divided into a number of separation zones by baffles 13. These baffles normally extend from the top almost to the bottom. The bottoms of the zones are in communication so that oil will flow from zone to zone while gas must stay in the zone it enters. Although the vessel shown is cylindrical, it could be constructed in other configurations. The vessel and baffles may be constructed of steel. The thickness of the material used to fabricate the outer wall and the end plates will be determined by separator operating pressure, vessel diameter and operating depth. While the vessel shown in FIG. 1 has only three zones, the separator contemplated by this invention could have many additional separation zones.

The well fluid inlets 15 are spaced along the vessel so that each is located in the upper portion of the vessel at the end of a separation zone. Although the elevation of the inlets can be varied considerably, they should be in that part of the separation zone occupied by gas, and preferably will be in the uppermost part of the separation zone. As shown in FIG. 1 and FIG. 2, each well fluid inlet may be formed by a conduit that penetrates the bottom wall of the vessel and extends upwardly into the upper part of a separation zone. This configuration is preferred for underwater installations because it makes it easy to directly connect the inlet conduits into receptacles in a subsea platform. The well fluid inlets are, however, not limited to this configuration. In some circumstances, for example, it may be desirable to locate ports in the upper part of the vessel to serve as inlets.

Each separation zone has a gas outlet in its upper end. The outlet is preferably a port located at the end of the separation zone opposite the well fluid inlet. By separating the gas outlet from the well fluid inlet by the total length of the separation zone, gas retention time is increased and a more efficient separation of gas and oil is achieved. The gas outlet ports 17 should be large enough to allow gas to escape from the separation zone in which it evolves at velocities low enough to permit droplets of oil that coalesce in the gas manifold to gravitate back into the separation zone.

Gas manifold 19 is shown mounted above the separator vessel in FIG. 1. The manifold is in communication with each of the gas outlet ports from the separator vessel. The manifold is preferably located above the vessel so that droplets of oil that coalesce within it will gravitate back into the vessel. The gas manifold could, of course, be located in an end extension of the separator, in an isolated upper compartment of the vessel, or in a position that is remote from the vessel. Gas is withdrawn from the manifold through port 21. Valve 23, a conventional back pressure valve, maintains the pressure within the manifold, and thus within the separator, at a preset operating level by controlling the discharge of gas through the gas outlet port. The gas manifold is not essential to the separator of the invention. Thus, in applications where little liquid carryover is anticipated, gas can flow directly into a gas gathering line provided a conventional back pressure valve is installed on the line to control separator pressure.

Oil outlet 25 is shown as a port located in the lower wall of the separation zone at the end of the vessel. Valve 27, a conventional float operated valve, controls the discharge of oil through the oil outlet, opening whenever the oil level within the separation chamber reaches a preset level and allowing oil to escape through oil outlet port 25 into a pipeline or other conduit. Alternatively, an oil outlet port could be located in each separation zone and connected to a common gathering manifold having its outlet controlled by a conventional float valve.

In operation, fluid streams from one or more wells are admitted through each fluid inlet 15 of the separator of FIG. 1 and FIG. 2. The gas and oil phases separate and most of the droplets of oil dispersed within the gas gravitate to the bottom of the separator vessel. Gas is discharged through gas outlet 17 while oil gathers in the bottom of the vessel. The discharged gas may be collected in a gas manifold 19 where additional entrained particles of oil may drop out of the gas, coalesce, and gravitate downwardly into the vessel through the gas outlet ports. Excess gas is discharged from the manifold through outlet port 21 and back pressure valve 23 into a gas pipeline for compression and transmission to market. Oil is free to flow from separation zone to separation zone and gathers in the lower portion of the vessel until the level required to actuate float valve 27 is reached. When the oil level exceeds that preset level, valve 27 opens and the excess oil is discharged through outlet port 25 into a pipeline.

FIG. 3 is a schematic of a separator built according to the invention for separating oil, gas, and water. Like the separator in FIG. 1 and FIG. 2, it is an elongated horizontal vessel 51 which is divided into several separation zones by baffles 55. Well fluid inlets 57 are again spaced along the length of the vessel so that each is located in the upper part of the vessel at the end of a separation zone. A gas outlet port 59 is located in the upper end of each separation zone opposite the well fluid inlet end. A gas manifold 61 is preferably mounted above the separation chamber and is in communication with each of the gas outlet ports. A port 63 is located in the end of the gas manifold. A conventional back pressure valve 65 maintains the pressure in the manifold and in the separator at a preset level. Because the liquid must be further separated into oil and water, at least two outlet ports are provided. The oil outlet port 67 may be located at the very end of the separator, while the water outlet port 69 may be located in the bottom of the separator near the end. The water outlet port may be located between the well fluid inlet port of the last separation zone and a water baffle 71, if desired. A conventional float operated valve 73 may be used to control the discharge of oil through port 67 in response to the oil level within the vessel. Similarly, a conventional float operated interface valve 75 may be used to control the discharge of water from the vessel through port 67 when the water reaches a preset level. A plurality of oil and water outlets could also be used in combination with separate gathering manifolds for each phase. For example, each separation zone could have a separate water outlet and a separate oil outlet, leading respectively to a water gathering manifold and an oil gathering manifold.

The operation of the three-phase separator of FIG. 3 is very similar to the operation of the two-phase separator of FIG. 1 and FIG. 2 except for the separation of the two liquid phases. The liquid collects in the lower part of the separator of FIG. 3 and, because of the difference in specific gravity between oil and water, the two liquids separate. The oil level rises within the chamber until it exceeds the level required to open oil outlet valve 73 which discharges the excess oil through port 67. Similarly, when the water-oil interface exceeds the level required to open water valve 75 the excess water is expelled through port 69 into a water disposal line.

Although the separator of the invention has been discussed primarily in terms of subsea installation, it is not limited to such applications. It will also be found useful on offshore platforms extending above the water's surface, at onshore locations, and anywhere else that phase separation operations must be performed.

What is claimed is:

1. Apparatus for separating a mixture of gas and liquid which comprises:
   a. an elongated horizontal vessel;
   b. a plurality of substantially vertical partitions extending downwardly from the top of the vessel and terminating above the bottom of the vessel, said partitions dividing said vessel into a plurality of separation zones communicating with one another near their lower ends;
   c. a separate well fluid inlet in each separation zone;
   d. a separate gas outlet in each separation zone, said outlet being positioned at a point remote from the well fluid inlet in the separation zone;
   e. an oil outlet in the lower part of the vessel.

2. Apparatus for separating a mixture of gas and liquid as defined in claim 1, including a gas manifold communicating with each said gas outlet, said gas manifold having a gas outlet port.

3. Apparatus for separating a mixture of gas and liquid as defined in claim 2 including means for controlling the discharging of gas through said gas manifold outlet port, said means being responsive to gas pressure within said manifold.

4. Apparatus for separating a mixture of gas and liquid as defined by claim 3 including means for controlling the discharging of oil through said oil outlet, said means responsive to the level of oil within said vessel.

5. Apparatus for separating a mixture of gas and liquid as defined by claim 3 including an oil outlet in each separation zone.

6. Apparatus for separating a mixture of gas and liquid as defined by claim 5 including means for controlling the discharging of oil through each said oil outlet, said means responsive to the oil level with said vessel.

7. Apparatus for separating a mixture of gas and liquid as defined by claim 3 including a water outlet in the lower part of the vessel below the oil outlet.

8. Apparatus for separating a mixture of gas and liquid as defined by claim 7 including:
   a. means for controlling the discharging of oil through said oil outlet, said means responsive to the oil level within said vessel;
   b. means for controlling the discharging of water through said water outlet, said means responsive to the water level within said vessel.

9. Apparatus for separating a mixture of gas and liquid as defined by claim 5 including a water outlet in the lower part of each separation zone below the oil outlet in each said separation zone.

10. Apparatus for separating a mixture of gas and liquid as defined by claim 9 including means for controlling the discharging of oil through each said oil outlet, said means responsive to the oil level within said vessel; and means for controlling the discharging of water through each said water outlet, said means responsive to the water level within said vessel.

11. A method of separating a liquid from a gas comprising:
   a. introducing a separate inlet stream of well fluid into each of a plurality of separation zones;
   b. maintaining the pressure within each zone sufficiently low to permit the formation of a gas and a liquid phase within each zone;
   c. withdrawing a separate stream of gas from the top of each zone at a rate sufficient to substantially prevent gas flow between zones, while permitting oil to flow between zones; and
   d. withdrawing liquid from the zones.

* * * * *